(12) United States Patent
Kho et al.

(10) Patent No.: US 8,276,985 B2
(45) Date of Patent: Oct. 2, 2012

(54) INFANT SEAT

(76) Inventors: David Chuanhankho Kho, La Pobla de Vallbona (ES); En-Chi Wang, Taichung (TW)

( * ) Notice: Subject to any disclaimer, the term of this patent is extended or adjusted under 35 U.S.C. 154(b) by 36 days.

(21) Appl. No.: 12/834,332

(22) Filed: Jul. 12, 2010

(65) Prior Publication Data

US 2011/0062752 A1  Mar. 17, 2011

(30) Foreign Application Priority Data

Sep. 17, 2009  (TW) ................................ 98131349 A

(51) Int. Cl.
*A47C 13/00* (2006.01)
*A47C 31/00* (2006.01)
*B62B 7/00* (2006.01)

(52) U.S. Cl. ...................... 297/130; 297/183.6; 297/118; 280/47.38

(58) Field of Classification Search .................. 297/130, 297/250.1, 256.16, DIG. 6, 440.14, 440.1, 297/118, 183.1, 183.6, 16.1; 280/47.38
See application file for complete search history.

(56) References Cited

U.S. PATENT DOCUMENTS

| | | | | |
|---|---|---|---|---|
| 3,596,986 A | * | 8/1971 | Ragsdale | 297/183.6 |
| 4,664,396 A | * | 5/1987 | Pietrafesa | 280/30 |
| 4,743,063 A | * | 5/1988 | Foster, Jr. | 297/130 |
| 5,127,120 A | * | 7/1992 | Mason | 5/655 |
| 6,224,148 B1 | * | 5/2001 | Lee et al. | 297/130 |
| 6,679,550 B2 | * | 1/2004 | Goor et al. | 297/216.11 |
| 7,909,400 B1 | * | 3/2011 | Delaney et al. | 297/256.16 |
| 2007/0080568 A1 | * | 4/2007 | Nakagawa et al. | 297/253 |

FOREIGN PATENT DOCUMENTS

| | | |
|---|---|---|
| EP | 1031490 A1 | 6/2000 |
| EP | 1640240 A2 | 3/2006 |

OTHER PUBLICATIONS

Europrean Patent No. 1031490 (A1); Publication Date: Jun. 30, 2000; Abstract Only; 1 Page.

* cited by examiner

*Primary Examiner* — Milton Nelson, Jr.
(74) *Attorney, Agent, or Firm* — Cantor Colburn LLP

(57) ABSTRACT

The present invention refers to an infant seat (10), in particular to be mounted to a baby carriage in a detachable manner, designed in such a way that it exhibits a seat configuration and coming from said seat configuration is transformable into a carry configuration, in which the infant seat may be used as a carrycot. According to the invention it is provided that the infant seat (10) comprises a separate unit serving as a carrycot (20), which is arranged in the seat configuration beneath an upper shell (12) of the infant seat (10). It is a particular advantage of the invention that the infant seat (10) can be transformed into the carrycot (20) with a small number of hand movements only. Furthermore in the mounted condition of the infant seat which is the seat configuration the carrycot is stored within the infant seat in a space saving manner.

18 Claims, 9 Drawing Sheets

INFANT SEAT

CROSS REFERENCE TO RELATED APPLICATION

This application claims priority to Taiwanese Patent Application No. 098131349, filed Sep. 17, 2009, which is incorporated herein by reference in its entirety.

TECHNICAL FIELD

The present invention concerns an infant seat, preferably to be mounted detachably on a baby carriage, which is designed to take a seat configuration and which can be transformed starting from this seat configuration into a carry configuration, in which the infant seat serves as a carrycot.

BACKGROUND

In the prior art document EP 1 031 490 A1 there is described a baby carriage which includes a seat element on a base frame comprising a seat part and a backrest part. It is possible to put a carrycot on the base frame and to fix it on the base frame by mounting parts. The seat part and the backrest part essentially consist of a skin of fabric, the fixing of which is effected by push buttons. The backrest part can be brought into a horizontal plane and the carrycot can be put down onto this plane. To fix said carrycot ribbons are used, which are wound around lateral bars of the base frame and are fastened with knots. This kind of baby carriage has a number of disadvantages. Firstly the mounting of the seat part on the base frame is somewhat cumbersome. The fixing of the carrycot on the base frame is not safe. In its standard seat configuration the baby carriage can only be used to accommodate a baby in sitting or lying position, whereas the carrycot is a separate element, which has to be stored and carried along separately and requires storing space, especially as it cannot be folded. The infant seat cannot be used as a separate seat unit apart from the base frame, carrying a baby therein for example for separate use of the seat in a car or the like.

From the prior art document EP 1 640 240 A2 it is known to design an infant seat in such a way that it can be transformed from a carry configuration, in which the baby lies in a flat position on the bottom of the seat, into a seat configuration, in which some parts of the bottom form an angle with each other, so it is possible to receive an infant in the seat in a sitting position. Thereby the frame of this infant seat is adjustable in such a way that upper parts and lower parts of the frame lie close to each other forming a flat frame, whereas in a carry configuration a higher receptacle for a baby in lying position is formed. The mechanism to transform the infant seat from the seat configuration into the carrycot configuration comprises a strap which is pulled in order to move hinged cross bars of the frame along a slide. The upper frame is coupled to the lower frame via cross struts. The mechanism to transform the infant seat from the carry configuration back to the seat configuration is not very comfortable and includes the risk for the user to pinch the fingers between the struts or the bars of the frame. It is not apparent how the carry cot or the seat is carried apart from the baby carriage. The receptacle which forms the carrycot is partly open on the sides.

Furthermore both above-mentioned solutions known from the prior art describe infant seats, which do not comply with today's requirements concerning a modern and elegant design and the current safety provisions.

The object of the present invention is to provide an infant seat of the above-mentioned kind, which represents a safe and comfortable seat for the child in the seat configuration, which also can be transported in a comfortable manner and wherein the infant can be carried in a secure manner in a lying position as well, when the infant seat has been converted to the carry configuration.

SUMMARY

The above-mentioned object is solved by an infant seat according to the present invention as it is defined in claim 1. According to the present invention the infant seat comprises a separate unit serving as a carrycot, which is disposed in the seat configuration beneath an upper shell, which has a seat-like shape.

The invention comes from the principle idea to provide a solid infant seat, receiving the infant securely in a sitting position, designed to be comfortably carried in this configuration, which can be detachably mounted to a base frame of a carriage in a simple way. Concerning its function and solidity this kind of an infant seat is more similar to an infant seat for cars than to such a kind, which has a cover or skin made of fabric only serving as the seating area of a carriage. The kind of infant seat according to the present invention furthermore comprises a carrycot as a separate unit integrated into the seat in the seat configuration. This means the carrycot is not established by transforming only the seating area of the seat.

According to one possible alternative solution the upper shell forming the seating area in the seat configuration is removable and underneath the separate carrycot is provided, both parts together forming a unit, however, in the seat configuration. The advantage is that the user carrying the infant seat in any case at the same time also carries along a carrycot, which is hidden under the upper shell of the seat.

According to one preferred embodiment of the present invention the separate unit serving as a carrycot in the seat configuration is disposed between an upper shell and at least one lower shell of the infant seat. In the mounted condition the infant seat forms a unit consisting of an upper shell and at least one lower shell, whereas both of them each can be composed of several parts as well. The carrycot is disposed as in a kind of sandwich structure between upper shell and lower shell of this arrangement. In the seat configuration or when transporting the infant seat the unit serving as carrycot can be housed between upper shell and at least one lower shell and it can be completely encased by upper shell and lower shell, such that in the seat configuration of the infant seat the carrycot is even not visible from outside.

This is an advantage as the user carrying the portable infant seat disposes of a carrycot as well, if he needs one. It is not necessary to take any time-consuming measurements to change functionality. It is sufficient to separate upper and lower shells, take out the carrycot and if necessary to transform it in such a manner that it complies with the carry function. Upper shell and lower shell(s), when connected with each other, form a complete solid self-supporting infant seat, which additionally serves as a housing for the carrycot.

Preferably upper shell and lower shell(s) can be connected to each other in their respective border areas to result in a single unit, preferably a circumferential connection between them is provided using for instance zip fasteners or hook-and-loop fasteners as connecting means. In such a case the respective connection between upper shell and lower shell(s) can be easily disconnected and the separate unit serving as a carrycot can be uncased.

In the seat configuration the carrycot preferably presents itself in a folded condition, in which it exhibits a low height only. In such a case the carrycot can be housed in the space formed between upper shell and lower shell without any difficulties.

The carrycot preferably comprises an outer (circumferential) frame, a foldable side area and a bottom. In the folded state the height of the carrycot essentially is defined by the height of the frame only. By unfolding the foldable side area in a direction essentially perpendicular to the bottom, the carrycot uncased from the infant seat can be brought into a condition ready for use, in which it has enough space to take up a baby in a lying position. In this condition the "carry configuration" according to the definition herein has been reached. In this configuration the foldable side area is stretched and preferably buttress elements are provided which stabilize the unfolded condition and which serve to avoid an unintentional refolding of the carrycot into the folded flat condition.

Preferably the infant seat according to the present invention comprises at least one handle bar, for example a bar or bracket essentially in U-shape, which can be mounted to the infant seat in its seat configuration in a detachable manner and which additionally can be mounted in a detachable manner to the carrycot, too. With such a handle bar the user has means to lift the infant seat in its whole and to carry it conveniently. If the infant seat is to be converted, the user first detaches the handle bar, then releases the connection between upper shell and the further elements of the infant seat, and takes off the upper shell so that then the carrycot can be uncased. Then the carrycot is unfolded in its condition ready for use and the handle bar is mounted to the carrycot, thus it can be carried. It is an advantage that the same handle bar is used in both configurations, so that no separate further element is needed to carry the carrycot.

The detachable mounting of the handle bar can for example be realized using push-in connecting means, provided at the handle bar and on a frame respectively to which the handle bar is mounted, said frame preferably being part of the carrycot. This solution has the advantage that after disassembling of the infant seat the frame to which the handle bar is connected is already located at the carrycot.

The handle bar is preferably detachably mounted to the infant seat and/or to the carrycot by snap or click connecting means. This presents a connection which can be easily and comfortably released and which is secure as well.

According to a preferred embodiment of the present invention the infant seat can be detachably mounted to the base frame of a baby carriage in the seat configuration, said infant seat in this seat configuration thereby comprising the carrycot. If the infant seat is dismounted from the base frame the user disposes of a carrycot as well, which forms part of said infant seat, which is a separate element and preferably is located within the infant seat under the upper shell.

According to a preferred embodiment of the invention the infant seat can not only be mounted on a base frame of a baby carriage in a detachable manner, but in the seat configuration it can alternatively by means of fastening elements also be mounted for example to a stand as well. The use of the infant seat according to the present invention is therefore not limited to the use in connection with a baby carriage. Such a stand for example can be a kind of support frame as it is used to lay down a baby in a raised position, for instance in a bathroom. Said stand can for example form a kind of children high chair in connection with the infant seat. This option of the invention has the advantage that the necessary fastening elements can be provided on the infant seat and on the carrycot as well. If said fastening elements are for instance provided on said frame which forms part of the carrycot, the carrycot can also be mounted on the stand after the infant seat has been converted to the carry configuration.

Connecting elements for mounting the carrycot or the infant seat on a stand or a support frame can be provided on the infant seat and/or on the carrycot. Said connecting elements can be designed for instance in such a manner that the infant seat or the carrycot can be mounted to the fastening elements of the stand by hooking the infant seat or the carrycot into a receiving groove or slot which form part of fastening devices on the stand or on a base frame of a baby carriage.

A preferred embodiment of the present invention provides that the carrycot can be mounted by connecting elements onto fastening elements of a stand in a tiltable manner, being tilted about a horizontal axis, such that the carrycot can be brought in a desired angle position when mounted on the stand.

A further subject of the present invention is a baby carriage comprising at least one infant seat of the above-mentioned kind, which can be mounted on a base frame of a baby carriage in a detachable manner.

A further subject of the present invention is a baby high chair comprising at least one infant seat or carrycot of the above-mentioned kind, which can be mounted to a stand or support frame by means of fastening elements in a detachable manner.

The features of the subclaims concern preferred embodiments of the present invention. Hence the invention is not limited to any embodiments described in the subclaims. Further advantages of the invention will arise from the following detailed description.

BRIEF DESCRIPTION OF THE DRAWINGS

In the following description preferred embodiments of the present invention are described in more detail by reference to the drawings, which show.

DETAILED DESCRIPTION

Figure 1:
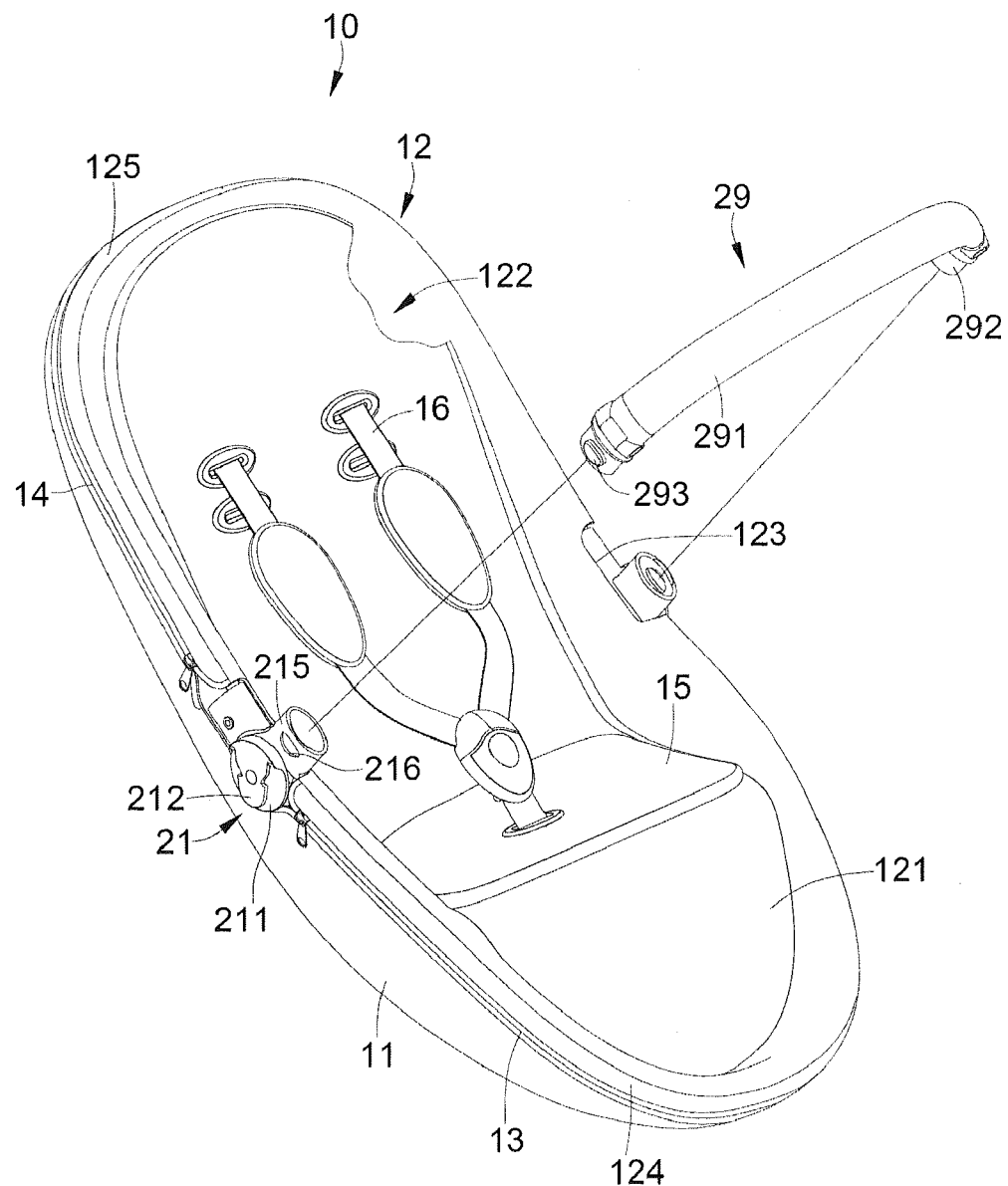
FIG. 1 a perspective view of an infant seat without a baby carriage in the mounted seat configuration.
Figure 2:
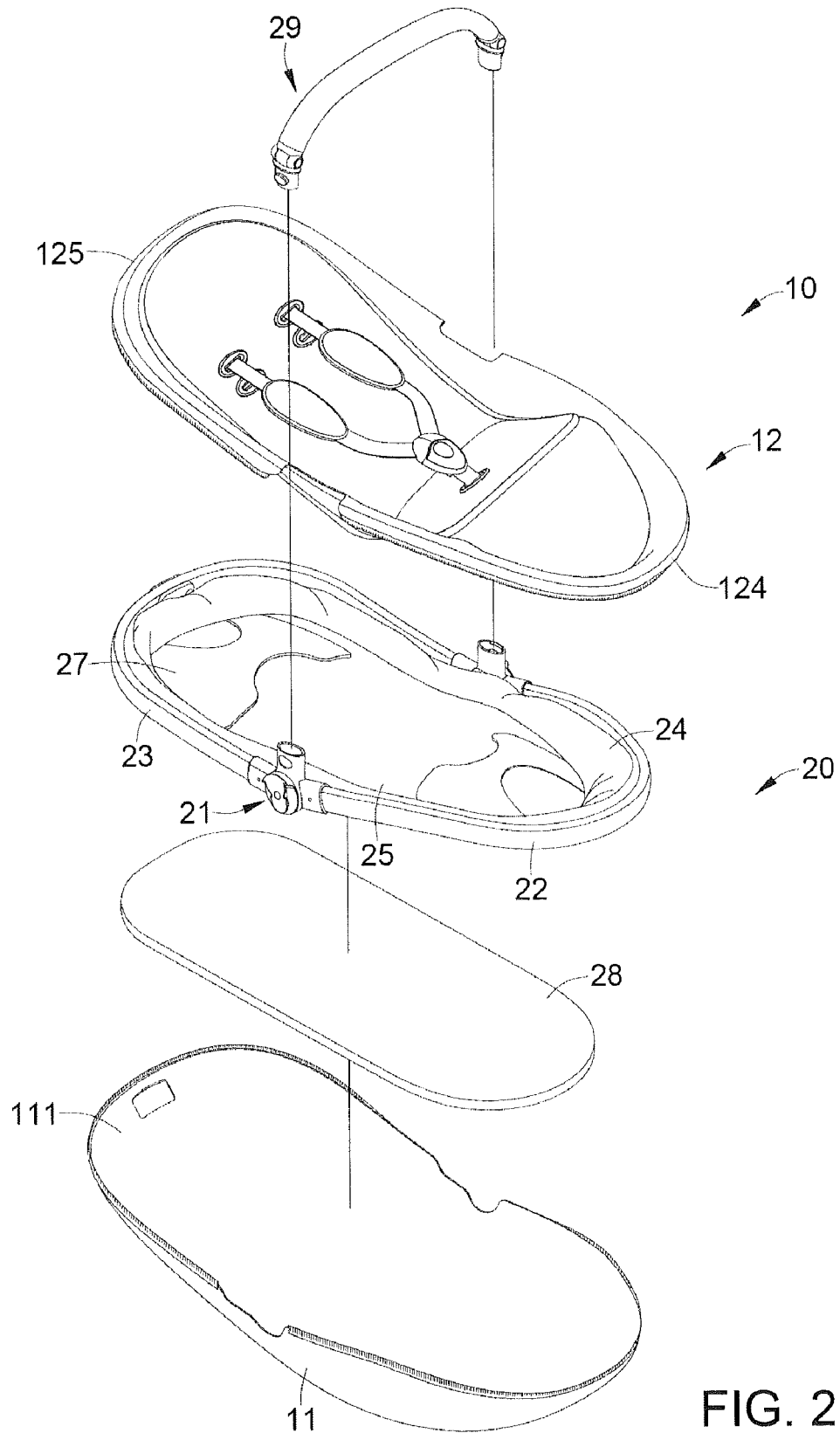
FIG. 2 a perspective exploded view of the main elements of an infant seat according the example of FIG. 1.

First we refer to FIGS. 1 and 2 which show a perspective view of an infant seat according to an example of the present invention in assembled condition and as an exploded view of the main elements of said infant seat. The infant seat is referred to as 10 in its whole. As can be seen from FIG. 2 it comprises a lower shell 11, an upper shell 12, a carrycot 20 being stored and encased within the infant seat 10 in a folded condition, a cushion 28 and a handle bar 29 which can be mounted to the infant seat 10 or alternatively to the carrycot 20 in a detachable manner, in order to seize this handle bar and carry the infant seat or the carrycot in a comfortable manner. The lower shell 11 has a receiving space 111, it is open to the top and has a concave shape seen from above. It may be made of plastic, which is chosen such that the lower shell 11 is sufficiently solid, but can also be transformed slightly within certain limits. This means it is more solid than a mere textile fabric. As can be seen when comparing FIGS. 1 and 2 the space (volume) required for the infant seat 10 essentially is defined by the size and shape of the lower shell 11. The overall height of the mounted infant seat 10 only is slightly higher than the lower shell 11 alone, as the further elements, namely the upper shell 12, which has an inclined seat shape on its upper side, and the carrycot 20 are received at least in their major part in the receiving space 111 of the lower shell 11 in the mounted condition. This kind of nested configuration of said elements 11, 12, 20 allows the storage of the carrycot within the infant seat of FIG. 1. This results in the advantage that the mounted infant seat does not claim essentially more space than a conventional infant seat (without carrycot).

When starting from the mounted condition shown in FIG. 1 first the handle bar 29 is detached. This may be for example a snap or click connection comprising snap buttons 293 at the ends of two legs 291 of the handle bar. These two legs 291 each have a push end 292, which can be inserted into a receipt 215 of a socket in the area of the joints 21 on a frame of the infant seat 10. These joints 21 are disposed on the frame 22, 23 which belongs to the carrycot 20 (see FIG. 2), which in the mounted condition is also the frame of the infant seat 10 in its whole. This is possible because the joints 21 are accessible from the outside even in the mounted condition of the infant seat as can be seen from FIG. 1, the joints each being disposed in the area of a recess in the lower shell 11 which can be seen from FIG. 2. The snap buttons 293 lie in the snapped condition, the handle bar 29 being mounted, within the snap holes 216 of the sockets 215. If the user pushes onto the snap button from the outside, this moves inwardly, being mounted resiliently for instance with a spring, and the respective leg 291 of the handle bar can be pulled out of the receipt of the socket 215 and can be taken off.

The upper shell 12 forms a solid rest for the infant and has a feet rest 121, a back rest 122, a seat area 15 with if necessary a cushion and belts 16 can be provided to fasten the infant. The lower shell 11 and the upper shell 12 are for example connected to each other by one or several zip fasteners 13, 14. These zip fasteners are disposed on the one hand in the area of the borders 124, 125 of the upper shell 12 and on the other hand in the area of the edges of the lower shell 11. After these zip fasteners have been opened the upper shell 12 can be removed from the lower shell 11. Thereby the carrycot 20 inside is accessible and can be taken out as well as the cushion 12. First the carrycot 20 is arranged in the folded condition wherein it needs little space as can be seen from FIG. 2. The carrycot 20 in its outer dimensions (perimeter) preferably is somewhat smaller than the receiving space 111 of the lower shell 11 in its upper edge area, where the lower shell has its largest dimensions, such that the carrycot 20 with its outer frame 22, 23 fits into the lower shell 11. In its height the folded carrycot 20 does not claim much more space than its outer frame as can be seen from FIG. 2.

In the following the configuration of the carrycot 20 is described in more detail while referring to FIGS. 2 to 4. Said carrycot comprises a bottom 25 which is sufficiently stable to support a baby, a foldable side area 24 comprising the side walls, a circumferential frame 22, 23 comprising two joints 21 being disposed essentially in the median area of the frame and lying opposite to each other. In the plan view the outline shape of the frame 22, 23 may be essentially an elongated oval shape. In the bottom 25 may be arranged plate like reinforcing elements which enhance the stability of the supporting structure. The cushion 28 may be insertable into the foot rest and back rest of the carrycot 20 after taking it out of the infant seat. The handle bar 29 is multifunctional as it can be mounted on the infant seat 10 in the complete seat configuration on one hand as can be seen from FIG. 1, in order to carry the infant seat 10. After taking out the encased carrycot 20, the handle bar 29 can be remounted with the ends of its legs 291 to the joints 21 on the frame of the carrycot 20 as can be seen from FIGS. 3 and 4, such that the carrycot can be carried by means of the same handle bar 29.

The two joints 21 which receive the respective bars of the frame 22, 23, which is composed of two essentially U-shaped brackets completing the elongated oval shape of the frame, each may have a T-shape with receiving sockets 215 directed to the top and two tubular sockets 213, 241 forming an angle of about 90° each to the receiving socket 215, said sockets 213, 241 thereby receiving the bars of the frame 22, 23. Furthermore located at the joints there is disposed a central connecting block 211 with an integrated connecting element 212, which serves to connect the infant seat 10 to the base frame of a baby carriage 30, which shall be explained in more detail referring to FIG. 5 hereafter.

Figure 3:
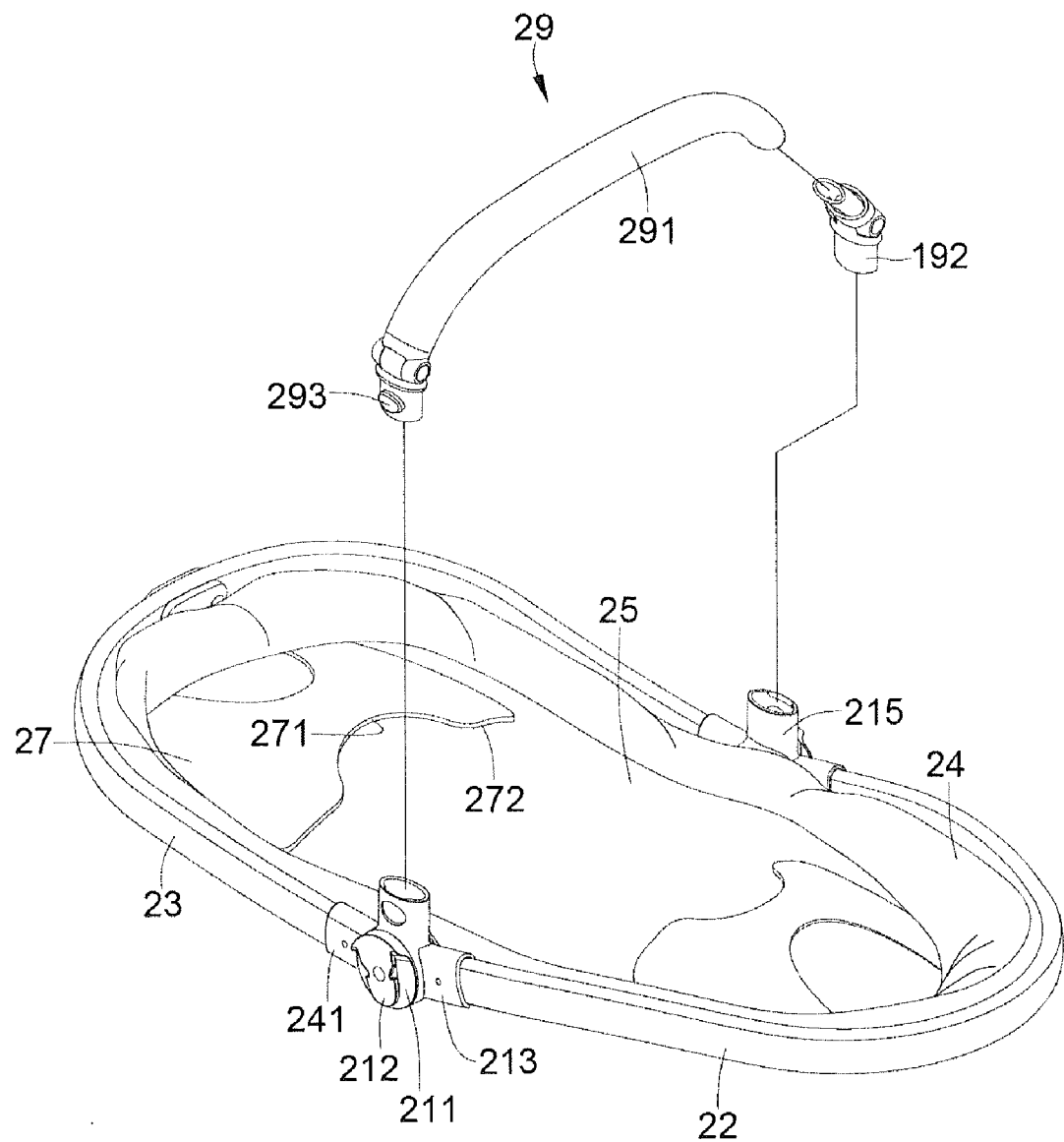
FIG. 3 an enlarged perspective view of the carrycot only which belongs to the infant seat shown in FIG. 1, the carrycot being in its folded condition.
Figure 4:
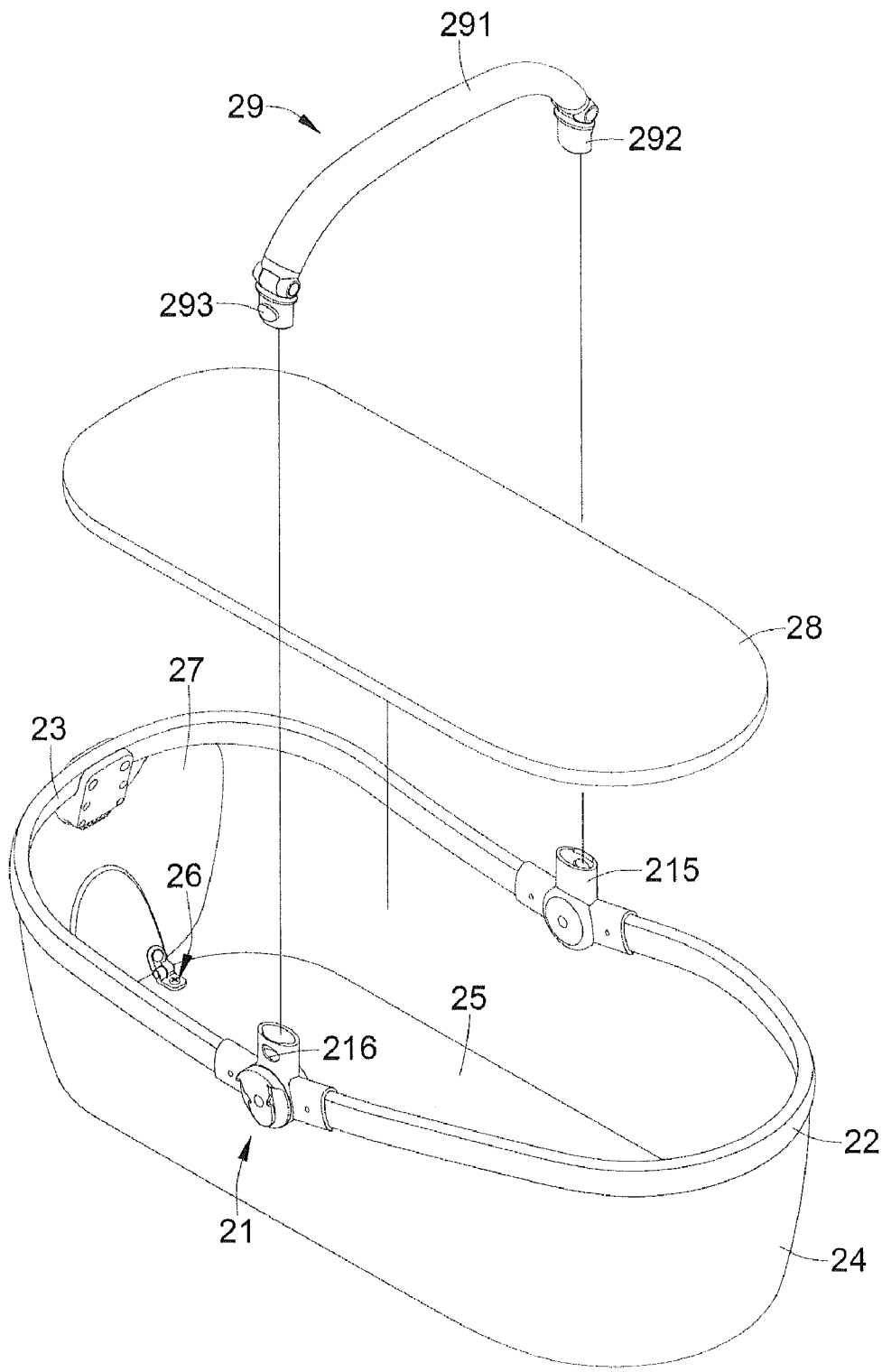
FIG. 4 an enlarged perspective view of the carrycot shown in FIG. 3 in its unfolded condition ready for use.

The carrycot 20 having been taken out of the infant seat 10 and thus being in the folded configuration as shown in FIG. 3, can be unfolded by raising the circumferential frame 22, 23 in a direction perpendicular to the plane of the bottom 25, the fabric of the folded side walls of the side area 24 thereby being tensioned, such that the before low folded carrycot 20 is now transformed into a receptacle as shown in FIG. 4, in which a baby can be transported. In order to tension and stabilize the side area 24 in this unfolded state two plate-like support elements 27 are provided in the feet area and in the head area of the space of the carrycot 20, which can be pivoted outwards for about 90° from a lying state wherein they are arranged flat and parallel to the bottom 25 as shown in FIG. 3 into an upright position wherein they can be fixed by inserting them beneath the bars 22, 23 of the circumferential frame. One of the two support elements 27 can be seen in FIG. 4 in the upright position, wherein also hinge elements 26 are shown, on which the support element 27 is mounted pivoting to the bottom 25 of the carrycot. In FIG. 3 the shape of the support element 27 can be seen, which is made of a stiffer material which is, however, still somewhat flexible in order to make it possible to release it from the inserted position. The support element has a plate-like shape with a central recess 271 serving as engagement part such that there is the possibility to lay down the support element 27 starting from the vertical support position shown in FIG. 4, in which it is seized beneath the rim of the frame 23, by gripping into the recess 271, bulging and slightly bending the support element 27 to release it and lay it down into the flat position before folding the carrycot 20 into the flat configuration, thereby folding the textile side area 24 of the carrycot. The tensioning of the side area 24 and thereby unfolding of the carrycot 20 into the upright position ready for use according to FIG. 4 can be carried out with a small number of hand movements only. In said unfolded position the frame 22, 23 is arranged in an upper position, the side area 24 is unfolded and tensioned and it is stabilized by the support elements 27, such that the side area cannot be refolded by its own and the side area forms together with the bottom 25 a solid stable receptacle which delivers sufficient space to carry a baby or infant up to a certain age. The carrycot 20, however, may be unfolded (folding of the side area 24, see FIG. 3), such that it fits into the space between upper shell 12 and lower shell 11 and can be received by the receiving space 111 of the lower shell 11 (see FIG. 2) and in the mounted configuration according to FIG. 1 the device is both visually and functionally taken for an infant seat and can be used as such. The carrycot 20 in this mounted state (seat configuration) is even not recognized, as it is encased in a kind of sandwich configuration between the inner space of upper shell 12 and lower shell 11.

Figures 5, 5A, 5B:
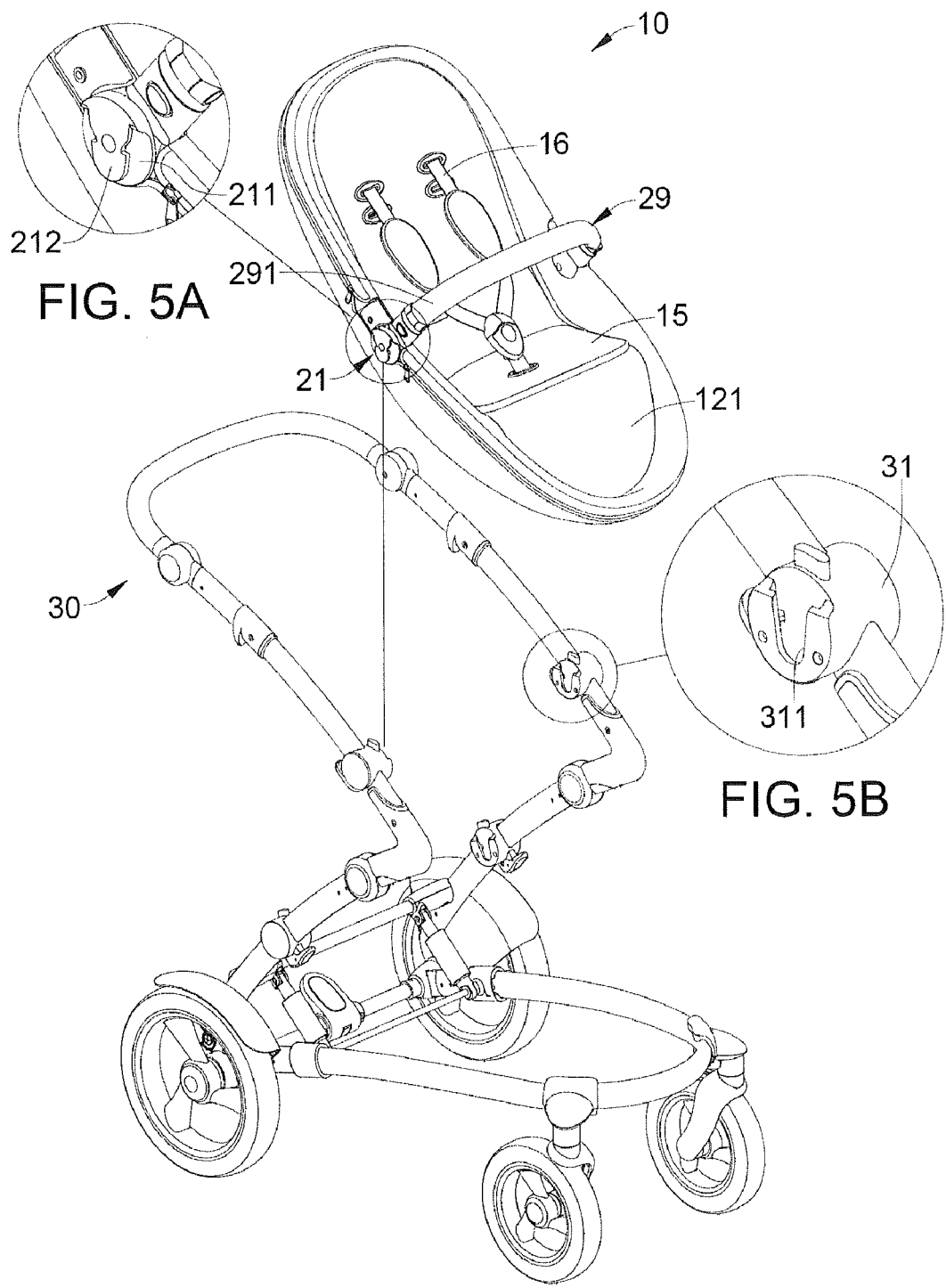
FIG. 5 a perspective view of a baby carriage base frame with an infant seat according to the example of FIG. 1 which can be mounted thereto.
FIG. 5A an enlarged detailed view in the area of one of the joints also showing the connecting element for mounting the infant seat.
FIG. 5B an enlarged detailed view of the base frame of the baby carriage, the fastening elements for mounting the infant seat being shown from the inner side.
Figure 6:
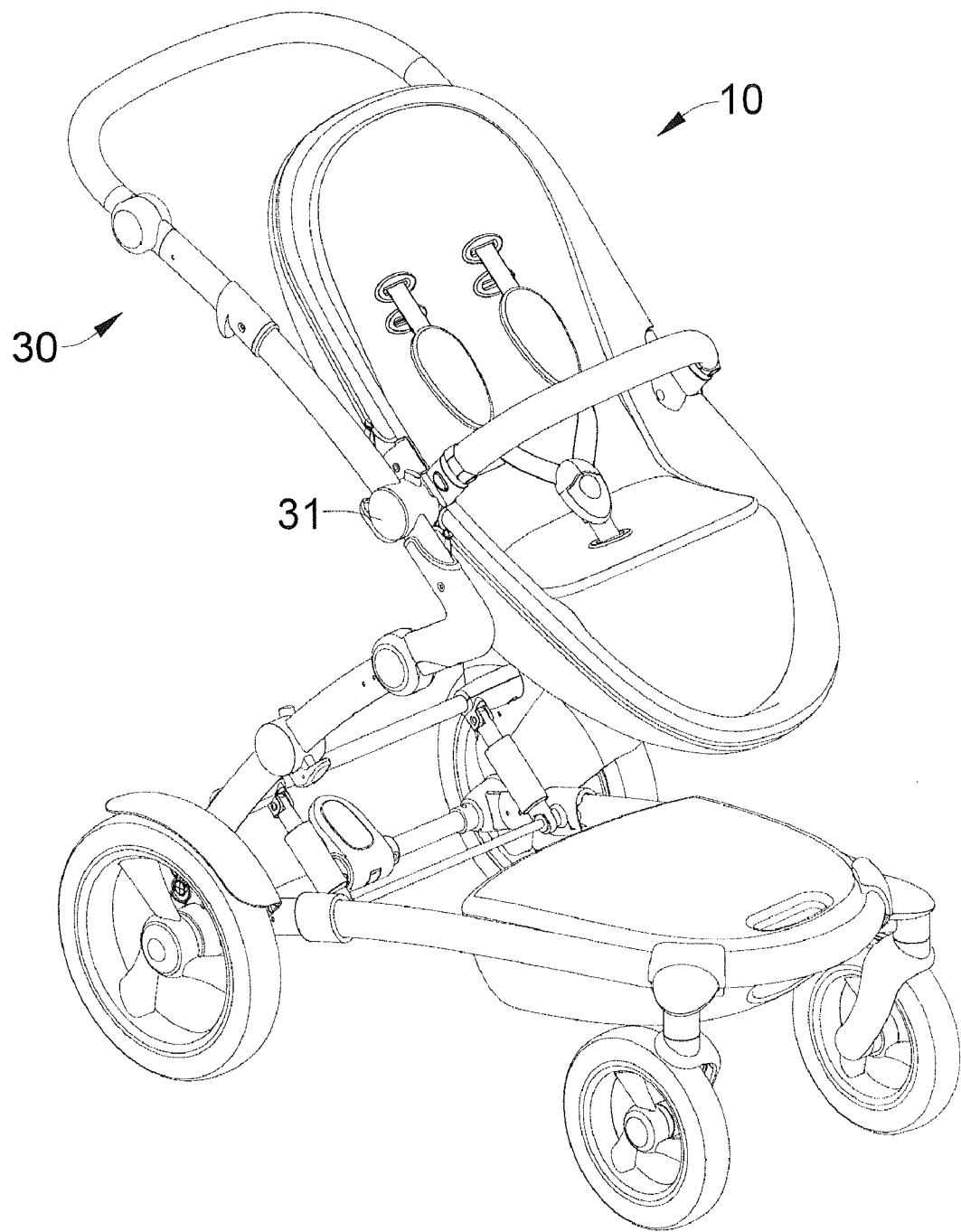
FIG. 6 a perspective view of a baby carriage with the infant seat mounted thereon.

In the following the mounting of the infant seat 10 to a base frame 30 of a baby carriage is explained in more detail referring to FIGS. 5, 5A and 5B. in the exploded view of FIG. 5 it can be seen that it is possible to put a complete infant seat 10 of the kind shown in FIG. 1 on the base frame 30 of a baby carriage and to fix the infant seat thereafter. This fixing can be done by means of mounting devices 31 disposed for example in the area of the joints of the frame. One of these mounting devices 31 is shown in FIG. 5B in an enlarged scale, thereby looking on the inner side of the base frame. It can be seen the undercut receiving groove 311 which may form part of the mounting device 31. FIG. 5A shows in an enlarged scale the region of one of the joints 21 on the infant seat 10. There is provided the connecting block 211 comprising a flat protrusion as a connecting element 212, which can be pushed into the undercut receiving groove 311 and fits therein, such that the infant seat 10 may be hooked into the base frame 30 of the baby carriage. To assure a safe mounting, a snap connection with respective click elements may be provided (which is not shown), thereby avoiding an unintentional lift-off of the infant seat 10. In order to release the infant seat 10 from the base frame 30 first the snap connection has to be unlatched. FIG. 5 intends to show the possibility to mount the infant seat 10 in a detachable manner onto the base frame 30 of a baby carriage. The resulting mounted configuration is shown in FIG. 6.

Figure 7:
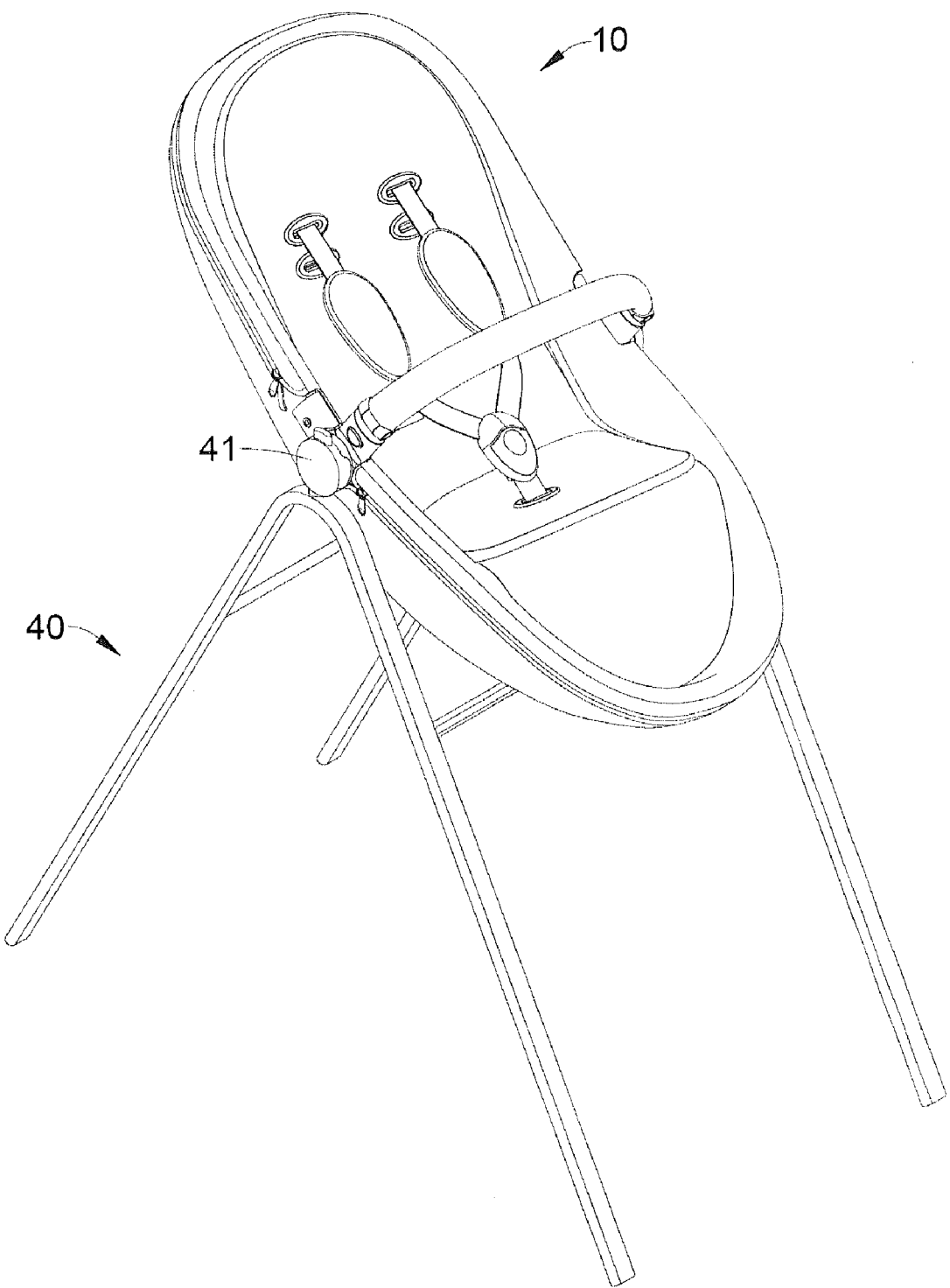
FIG. 7 a perspective view of a stand with the infant seat mounted thereto, forming a kind of high chair.

In the following it is referred to FIG. 7, wherein it is shown that the infant seat 10 according to the present invention cannot only be mounted onto a base frame of a baby carriage but also, for instance can be mounted to a stand 40 alternatively, as for example it is used in bath rooms to lay down a baby safely in a high position. Such a device as it is shown in FIG. 7 can also be used as a kind of high chair, in which the infant takes a lying or a sitting position. For this purpose two mounting devices 41 can be arranged on the stand 40, which can be designed in a similar manner as the mounting devices 31 on the base frame 30 as shown in FIG. 5B. Thus said mounting devices 41 can interact in a similar manner with the corresponding connecting elements 212 (see FIG. 5A) of the infant seat 10, when mounting the infant seat to the stand 40.

Figure 8:
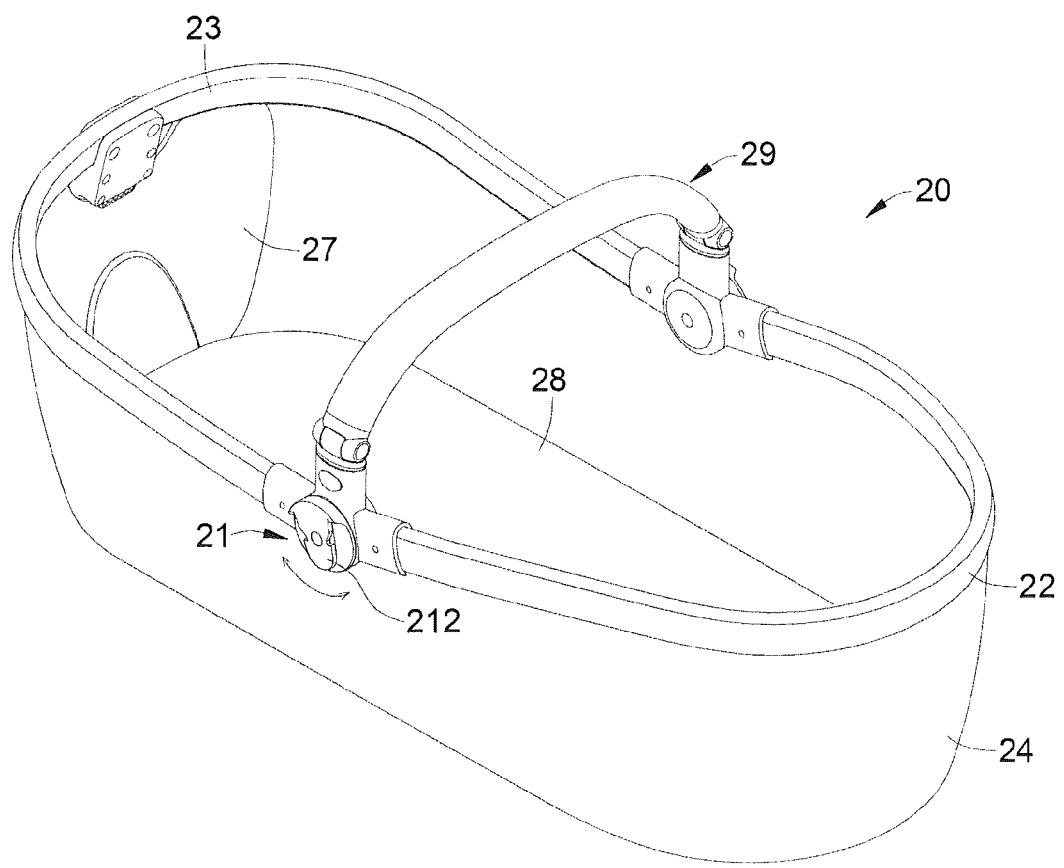
FIG. 8 a perspective view of the carrycot with a handle bar mounted thereto.
Figure 9:
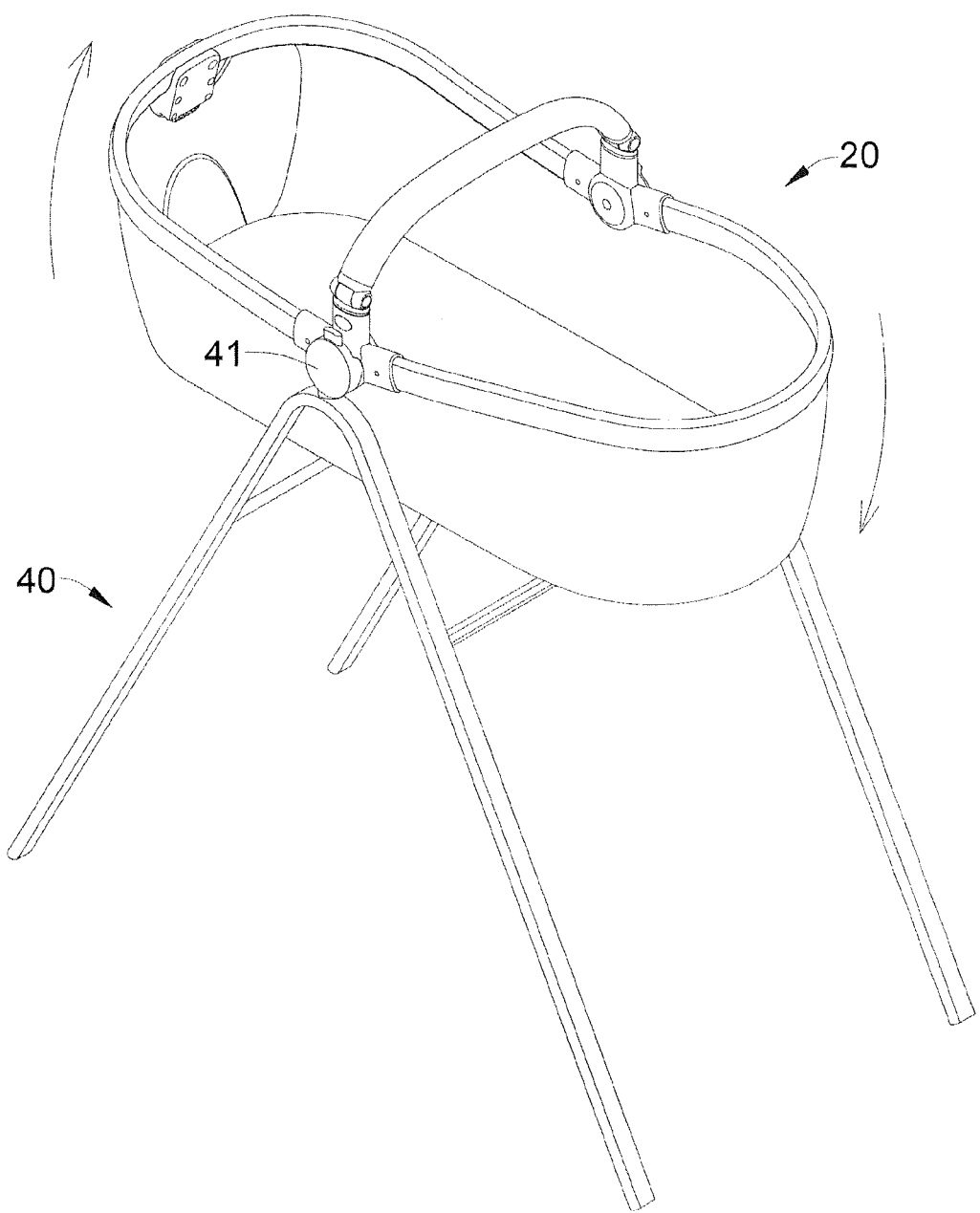
FIG. 9 a perspective view of the carrycot being mounted on a stand.

In the following it is referred to FIGS. 8 and 9, thereby explaining again function and possibilities of use for the carrycot 20. Said carrycot 20 is shown in FIG. 8 in its raised unfolded configuration ready for use by carrying it. It can be seen the handle bar 29 which is mounted in the area of the joints 21 by snap connection or the like. The textile side area 24 is tensioned. By comparing FIG. 8 to FIG. 1 it becomes apparent that the handle bar 29 for the transport of the carrycot 20 is the same as for the transport of the complete infant seat 10. The handle bar 29 may be released from the infant seat 10, thereafter the infant seat being dismounted (see FIG. 2) and then the handle bar 29 can be remounted to the frame in the area of the joints 21 by inserting the push ends 292 into the receipts 215 and engaging them therein by snap connection (see FIG. 4). In order to facilitate the mounting and releasing of the handle bar 29, the push ends 292 on the ends of the legs 291 of the handle bar may be connected in a pivoting manner. Furthermore it may be provided that the joints 21 can be turned around an axis going through both joints in transverse direction of the carrycot 20 within a certain angle (see arrows in FIG. 8), such that it is possible to adjust the angular position and thus the tilting position of the carrycot 20 mounted on the stand 40, as it is indicated by arrows in FIG. 9. For this purpose the joints 21 may be adjustable and may comprise for example disc shaped outer parts, which can be turned against other parts of the joints, which means multi-part mounting devices 41 are used.

LIST OF REFERENCE NUMBERS 10 infant seat
11 lower shell
111 receiving space
12 upper shell
121 feet rest
122 back rest
123 recess
124 border
125 border
13 zip fastener
14 zip fastener
15 seat area
16 belts
20 carrycot
21 joint
211 connecting block
212 connecting element (protrusion)
213 tubular socket
241 tubular socket
215 receipt of socket
216 snap holes
22 frame
23 frame
24 side area
25 bottom
26 joint elements
27 support elements
271 recess
28 cushion
29 handle bar
291 leg
292 push end
293 snap buttons
30 base frame of the carriage
31 mounting devices
311 receiving groove
40 stand
41 mounting devices

The invention claimed is:
1. Infant seat, to be mounted to a baby carriage in a detachable manner, designed in such a way that the infant seat exhibits a seat configuration and coming from said seat configuration is transformable into a carry configuration, in which the infant seat may be used as a carrycot,
wherein the infant seat (10) comprises a separate unit serving as a carrycot (20), which is arranged in the seat configuration beneath an upper shell (12) of the infant seat (10), in said seat configuration the carrycot (20) being in a folded state wherein the carrycot (20) has a low height only, wherein said separate unit serving as the carrycot (20) in the seat configuration is disposed between the upper shell (12) and at least one lower shell (11) of the infant seat (10), wherein the at least one lower shell (11) exhibits a concave receiving space (111), which in the seat configuration receives the unit serving as the carrycot at least partly, and wherein the unit serving as the carrycot (20) in the seat configuration and/or in a transport state of the infant seat (10) is received between the upper shell (12) and the at least one lower shell (11) and is encased completely between the upper shell and the at least one lower shell (11).

2. Infant seat according to claim 1,
wherein the infant seat comprises at least one handle bar (29) which can be mounted to the infant seat (10) in a detachable manner in the seat configuration, wherein said handle bar (29) also can be mounted to the carrycot (20) in a detachable manner.

3. Infant seat according to claim 1,
wherein the infant seat (10) in the seat configuration can be mounted to a base frame (30) of a baby carriage, wherein in said seat configuration the infant seat (10) comprises the carrycot (20).

4. Infant seat according to claim 1, wherein in the seat configuration the infant seat (10) can be mounted to a stand (40) by means of mounting devices (41) in a detachable manner.

5. Infant seat according to claim 1, wherein the carrycot (20) can be mounted to mounting devices (41) of a stand by means of connecting elements (212) in a manner that said carrycot can be tilted around a horizontal axis.

6. Baby carriage, wherein the baby carriage comprises at least one infant seat (10) according to claim 1, which is able to be mounted to a base frame (30) of the baby carriage in a detachable manner.

7. High chair for infants, wherein the high chair comprises at least one infant seat (10) or at least one carrycot (20) according to claim 1, which can be mounted to a stand (40) by means of mounting devices (41) in a detachable manner.

8. Infant seat according to claim 1,
wherein the infant seat is transformable from the seat configuration configured to receive a baby in a seated position, into a carry configuration configured to receive a baby in a lying configuration; and
wherein the infant seat is mountable to a base frame in a detachable manner.

9. The infant seat according to claim 1, wherein when the carrycot (20) has the low height only, the carrycot (20) is housed in a space formed between the upper shell (12) and the at least one lower shell (11).

10. The infant seat according to claim 1, wherein the low height only is about the height of an outer frame (22, 23) of the carrycot (20).

11. Infant seat according to claim 1,
wherein a handle bar (29) can be mounted to the frame (22, 23) in a detachable manner by means of insertable connecting elements (292, 215), wherein said frame (22, 23) is arranged on the carrycot (20).

12. Infant seat according to claim 11,
wherein the handle bar (29) can be mounted to the infant seat (10) and/or to the carrycot (20) by releasable snap or click means (293, 216).

13. Infant seat according to claim 1, wherein in the carry configuration the carrycot (20) can be mounted by means of connecting elements (212) to a stand (40) in a detachable manner.

14. Infant seat according to claim 13, wherein connecting elements (212) are disposed at the infant seat (10) or at the carrycot (20), which can be mounted to mounting devices (31, 41) by hooking said connecting elements into a receiving groove (311), said mounting devices being disposed at a base frame (30) of a baby carriage or at a stand (40).

15. Infant seat according to claim 1,
wherein the upper shell (12) and the at least one lower shell (11) can be connected to each other in their respective circumferential border areas to result one single unit.

16. Infant seat according to claim 15,
wherein as a connecting means to connect the upper shell (12) and the at least one lower shell (11) with each other at least one zip fastener (13, 14) or hook-and-loop fastener or any other suitable connecting means is provided.

17. Infant seat according to claim 16,
wherein the carrycot (20) has a circumferential frame (22, 23), a foldable side area (24) and a bottom (25) and that in the folded state the height of the carrycot is essentially defined by the height of the circumferential frame (22, 23).

18. Infant seat according to claim 17, wherein in the carry configuration the foldable side area (24) is unfolded and stabilized by support elements (27) and that in the carry configuration the carrycot (20) has a height in a direction perpendicular to the bottom (25) which is sufficient to receive a baby.

* * * * *